(12) United States Patent
Yoshizumi

(10) Patent No.: US 10,102,425 B2
(45) Date of Patent: Oct. 16, 2018

(54) CONTROLLING APPARATUS AND INSPECTION METHOD

(71) Applicant: CANON KABUSHIKI KAISHA, Tokyo (JP)

(72) Inventor: Hideki Yoshizumi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/604,355

(22) Filed: May 24, 2017

(65) Prior Publication Data

US 2017/0344818 A1 Nov. 30, 2017

(30) Foreign Application Priority Data

May 31, 2016 (JP) .................. 2016-108112

(51) Int. Cl.
| | |
|---|---|
| *G06F 15/00* | (2006.01) |
| *G06K 9/00* | (2006.01) |
| *G06F 3/12* | (2006.01) |
| *H04N 1/00* | (2006.01) |

(52) U.S. Cl.
CPC ........ *G06K 9/00442* (2013.01); *G06F 3/1203* (2013.01); *G06F 3/1268* (2013.01); *G06F 3/1273* (2013.01); *G06F 3/1286* (2013.01); *H04N 1/00037* (2013.01); *H04N 1/00408* (2013.01); *H04N 1/00798* (2013.01)

(58) Field of Classification Search
CPC .... G06F 3/1203; G06F 3/1286; G06F 3/1268; G06F 3/1273; H04N 1/00408; H04N 1/00037; H04N 1/00798; G06K 9/00442

USPC ................................ 358/1.15, 1.12
See application file for complete search history.

(56) References Cited

U.S. PATENT DOCUMENTS

| | | | |
|---|---|---|---|
| 9,262,111 B2* | 2/2016 | Fujinaga | G06F 3/1263 |
| 2009/0024950 A1* | 1/2009 | Salgado | G06F 3/1204 |
| | | | 715/772 |
| 2010/0097624 A1 | 4/2010 | Hirakawa | |
| 2014/0300918 A1* | 10/2014 | Kiriyama | G06K 9/00442 |
| | | | 358/1.14 |

FOREIGN PATENT DOCUMENTS

JP 2010-94899 4/2010

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A controlling apparatus for controlling a printer includes at least one memory storing instructions and at least one processor. The processor executes the instructions to receive a print job, and determine whether there is a difference between a first conveying mechanism that has been used for a first print job received and a second conveying mechanism that is to be used for a second print job received after the first print job. The instructions are also executed to, according to the determination that there is a difference between the first conveying mechanism and the second conveying mechanism, perform an inspection process based on a result of reading a print medium that has been conveyed using the second conveying mechanism, after a printing operation of the first print job.

10 Claims, 16 Drawing Sheets

| ITEM | SETTING VALUE |
|---|---|
| PRINT MEDIUM SIZE | A4 |
| PRINT MEDIUM TYPE | PLAIN PAPER |
| PRINT LAYOUT | DUPLEX |
| INK SETTING | COLOR |
| NUMBER OF PAGES | 5 |
| NUMBER OF COPIES | 3 |
| PRINT QUALITY | HIGH QUALITY |

FIG.5A

| ITEM | SETTING VALUE |
|---|---|
| PRINT MEDIUM SIZE | A4 |
| PRINT MEDIUM TYPE | PLAIN PAPER |
| PRINT LAYOUT | SIMPLEX |
| INK SETTING | COLOR |
| NUMBER OF PAGES | 1 |
| NUMBER OF COPIES | 3 |
| PRINT QUALITY | HIGH SPEED |

FIG.5B

| ITEM | SETTING VALUE |
|---|---|
| PRINT MEDIUM SIZE | A4 |
| PRINT MEDIUM TYPE | PLAIN PAPER |
| PRINT LAYOUT | SIMPLEX |
| INK SETTING | COLOR |
| NUMBER OF PAGES | 14 |
| NUMBER OF COPIES | 3 |
| PRINT QUALITY | HIGH QUALITY |

FIG.6A

| ITEM | SETTING VALUE |
|---|---|
| PRINT MEDIUM SIZE | A4 |
| PRINT MEDIUM TYPE | PLAIN PAPER |
| PRINT LAYOUT | SIMPLEX |
| INK SETTING | BLACK |
| NUMBER OF PAGES | 10 |
| NUMBER OF COPIES | 3 |
| PRINT QUALITY | HIGH SPEED |

FIG.6B

| ITEM | PRINTING MECHANISM INFLUENCE |
|---|---|
| PRINT MEDIUM SIZE | HAVING |
| PRINT MEDIUM TYPE | HAVING |
| PRINT LAYOUT | HAVING |
| INK SETTING | NOT HAVING |
| NUMBER OF PAGES | NOT HAVING |
| NUMBER OF COPIES | HAVING |
| PRINT QUALITY | NOT HAVING |

FIG.7

| ITEM | SETTING VALUE |
|---|---|
| PRINT MEDIUM SIZE | A4 |
| PRINT MEDIUM TYPE | PLAIN PAPER |
| PRINT LAYOUT | DUPLEX |
| INK SETTING | COLOR |
| NUMBER OF PAGES | 1 |
| NUMBER OF COPIES | 1 |
| PRINT QUALITY | HIGH QUALITY |

FIG.8

| ITEM | IMAGE INFLUENCE |
|---|---|
| PRINT MEDIUM SIZE | HAVING |
| PRINT MEDIUM TYPE | HAVING |
| PRINT LAYOUT | HAVING |
| INK SETTING | HAVING |
| NUMBER OF PAGES | NOT HAVING |
| NUMBER OF COPIES | HAVING |
| PRINT QUALITY | HAVING |

FIG.10

INSPECTION INTERVAL

| NUMBER OF PAGES | NUMBER OF COPIES |
|---|---|
| 5 | 3 |

FIG.13A

PAGE/COPY COUNTER

| NUMBER OF PAGES | NUMBER OF COPIES |
|---|---|
| 3 | 1 |

FIG.13B

CONTROLLING APPARATUS AND INSPECTION METHOD

BACKGROUND OF THE INVENTION

Field of the Invention

The present invention relates to a controlling apparatus and an inspection method for inspecting printed matter produced by a printing apparatus.

Description of the Related Art

In the commercial printing market such as Print On Demand (POD), various types of printed matter can be produced according to various needs. Greater importance is placed on efficient inspections of the various types of printed matter.

Japanese Patent Laid-Open No. 2010-94899 discloses a method of efficiently inspecting a printed image by appropriately interrupting continuously-input print jobs with printing of a predetermined inspection image and an inspection process. According to Japanese Patent Laid-Open No. 2010-94899, the printing of the inspection image and the inspection process are carried out each time pages or copies are output in a predetermined number based on a print job.

Incidentally, in a printing apparatus capable of printing images on print media of various types and sizes in various forms such as recent POD equipment, printing is carried out by changing operations of mechanisms included in the printing apparatus for each job. For example, a conveying path or conveying rollers to be used may be changed according to whether simplex printing or duplex printing is selected. Further, a paper feed unit and a discharging unit are changed in the case of using a print medium of a different size or type. Furthermore, whether to use a fixing unit and a fan may be determined and a printing speed may be changed according to the type of print medium.

It should be noted that the above changes of the mechanism operations occur irregularly in response to input jobs. Accordingly, there is a case where a mechanism that has not been used for a long time is used again depending on the condition of an input job. In this case, the possibility of any problem in an image is higher than usual until the operation of the mechanism is stabilized. If an inspection is carried out at intervals of a predetermined number of copies or pages as disclosed in Japanese Patent Laid-Open No. 2010-94899, a problem may occur at the time when a print job is switched to a new one because the timing of the inspection is irrelevant to the timing of the change of the mechanisms.

SUMMARY OF THE INVENTION

The present invention has been accomplished in order to solve the above problem. Therefore, the object of the present invention is to provide a controlling apparatus and an inspection method for a printing apparatus enabling highly-reliable and stable image output by carrying out an efficient inspection process in the case of continuously outputting various types of printed matter in response to various print jobs.

According to a first aspect of the present invention, there is provided a controlling apparatus comprising: a receiving unit configured to receive a print job; a determination unit configured to determine whether there is a difference in a conveying mechanism based on settings of a first print job received by the receiving unit and settings of a second print job executed before the first print job; and an execution unit configured to execute an inspection process based on a result of reading by an image reading unit in a case where the determination unit determines that there is a difference in the conveying mechanism.

According to a second aspect of the present invention, there is provided an inspection method comprising the steps of: receiving a print job; determining whether there is a difference in a conveying mechanism based on settings of a first print job received in the receiving step and settings of a second print job executed before the first print job; and executing an inspection process based on a result of reading by an image reading unit in a case where it is determined that there is a difference in the conveying mechanism in the determining step.

Further features of the present invention will become apparent from the following description of exemplary embodiments with reference to the attached drawings.

BRIEF DESCRIPTION OF THE DRAWINGS

FIGS. 5A and 5B are tables showing examples of job items in a print job storage unit;

FIGS. 6A and 6B are tables showing examples of job items in a job history storage unit;

FIG. 7 is a table showing settings in a mechanism influence item storage unit;

FIG. 8 is a table showing an example of job items in an inspection job storage unit;

FIG. 10 is a table showing settings in an image influence item storage unit;

FIGS. 13A and 13B are tables showing inspection intervals and counting states;

DESCRIPTION OF THE EMBODIMENTS (First Embodiment)

Figure 1:
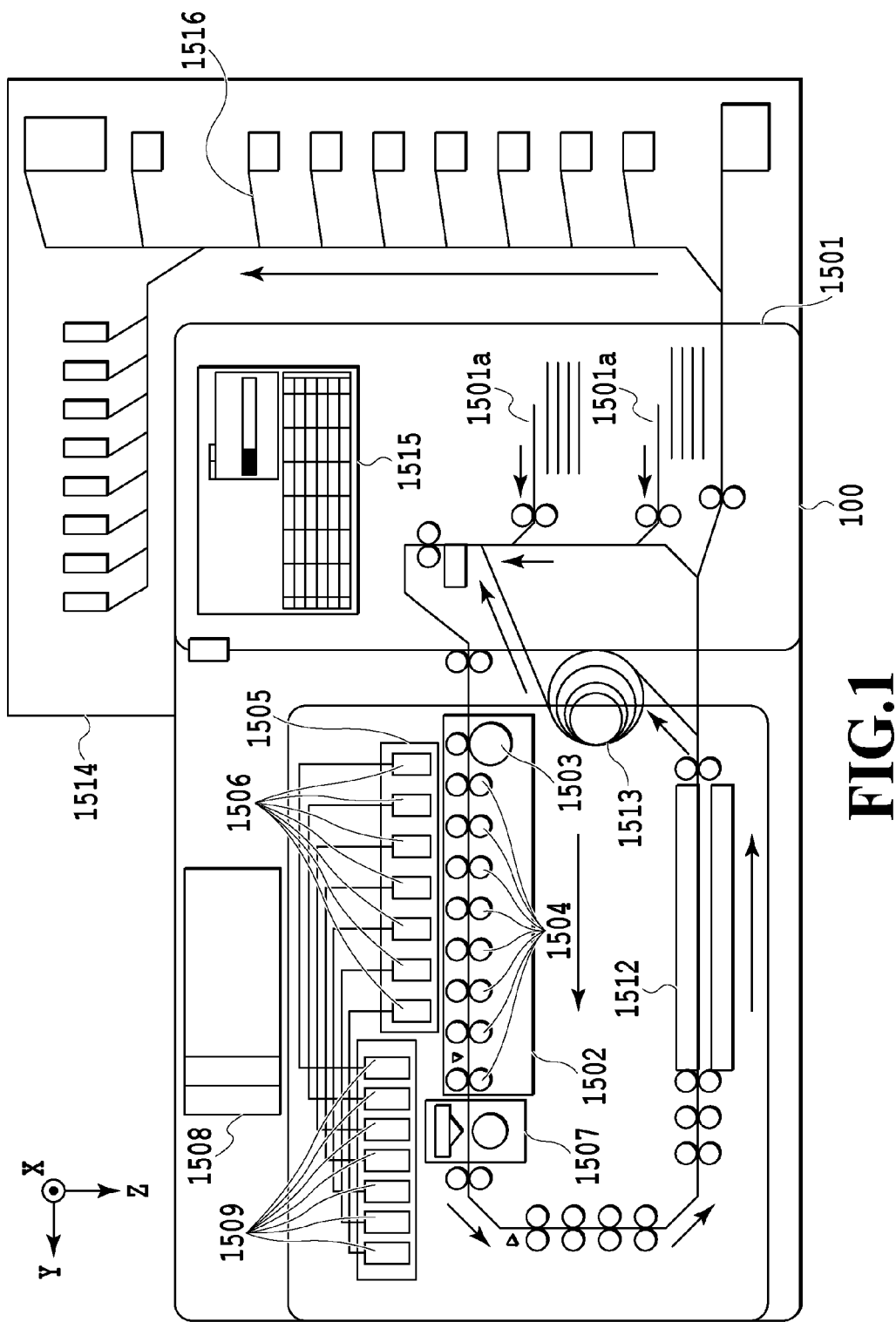
FIG. 1 is a diagram showing internal mechanisms of a printing apparatus which can be used in the present invention.

FIG. 1 is a diagram showing internal mechanisms of a printing apparatus 100 which can be used in the present invention. A control unit 1508 controls each mechanism in the apparatus via a corresponding engine. A paper feed unit 1501 has paper feed trays 1501a and feeds print media corresponding to a received print job one by one to a conveying path. A user can set the print media on the paper feed trays 1501a from the front.

A print medium fed from the paper feed unit 1501 is conveyed at a predetermined speed by rotation of conveying rollers 1504 while being supported by the conveying rollers 1504. During the conveyance, an image is printed on a surface of the print medium by printing heads 1506 arranged in a head unit 1505. The printing heads 1506 are full-line heads in which inkjet ejecting elements that eject ink in a Z direction are arranged in an X direction. As an ink ejection system, a system using a heating element, a piezo element, an electrostatic element, a MEMS element or the like may be adopted. The surface of the print medium is kept in parallel to ejection surfaces of the printing heads 1506 by the conveying rollers 1504. The printing heads 1506 corresponding to the number of ink colors are arranged in the direction of conveyance (i.e., a Y direction) and ink is supplied to each printing head 1506 from an ink tank 1509 storing corresponding ink through a tube. The conveyance speed and position of the print medium being conveyed are detected by an encoder 1503, and the control unit 1508 controls ejection timings of each printing head 1506 based on detection signals.

A scanner unit 1507 for scanning a printed image and the like is located downstream from the head unit 1505 in the direction of conveyance. Image data scanned by the scanner unit 1507 is provided to the control unit 1508 and used for various inspections. For example, the control unit 1508 can cause the head unit 1505 to print a predetermined inspection image, cause the scanner unit 1507 to scan the image, and inspect the image based on a result of the scan. The control unit 1508 can also determine the conveyance state of a print medium and the type of print medium by conveying the print medium without causing the head unit 1505 to print.

A drying unit 1512 for facilitating fixing of a printed image is located further downstream from the scanner unit 1507. The drying unit 1512 may be configured to contact a heat fixing unit with the unprinted side of the print medium or blow air toward the printed side of the print medium.

The conveying path is divided in two directions further downstream from the drying unit 1512. A print medium with one side printed in simplex printing or a print medium with both sides printed in duplex printing is conveyed to the output tray 1516 corresponding to the size of the print medium through a path toward a sorting unit 1514. Each output tray 1516 may be equipped with an LED or the like for notifying a user of a stacking state of print media.

On the other hand, a print medium with the back side not yet printed in duplex printing is conveyed from the drying unit 1512 to a sheet reversing unit 1513 and reversed in the sheet reversing unit 1513. The reversed print medium is conveyed by the conveying rollers 1504 again with the back side directed toward the printing heads 1506 and then the head unit 1505 prints an image on the back side.

An operating unit 1515 has a display panel and an operating panel to provide a user with information on the apparatus and receive instructions from a user. A user can check the progress of printing of an ordered image, the position of the output tray 1516 to store printed matter, the remaining amount of ink, the remaining amount of printing paper in the paper feed unit 1501, and the like through the operating unit 1515. The user can also give instructions to clean the printing heads 1506, calibrate the scanner unit 1507, and the like through the operating unit 1515.

Figure 2:
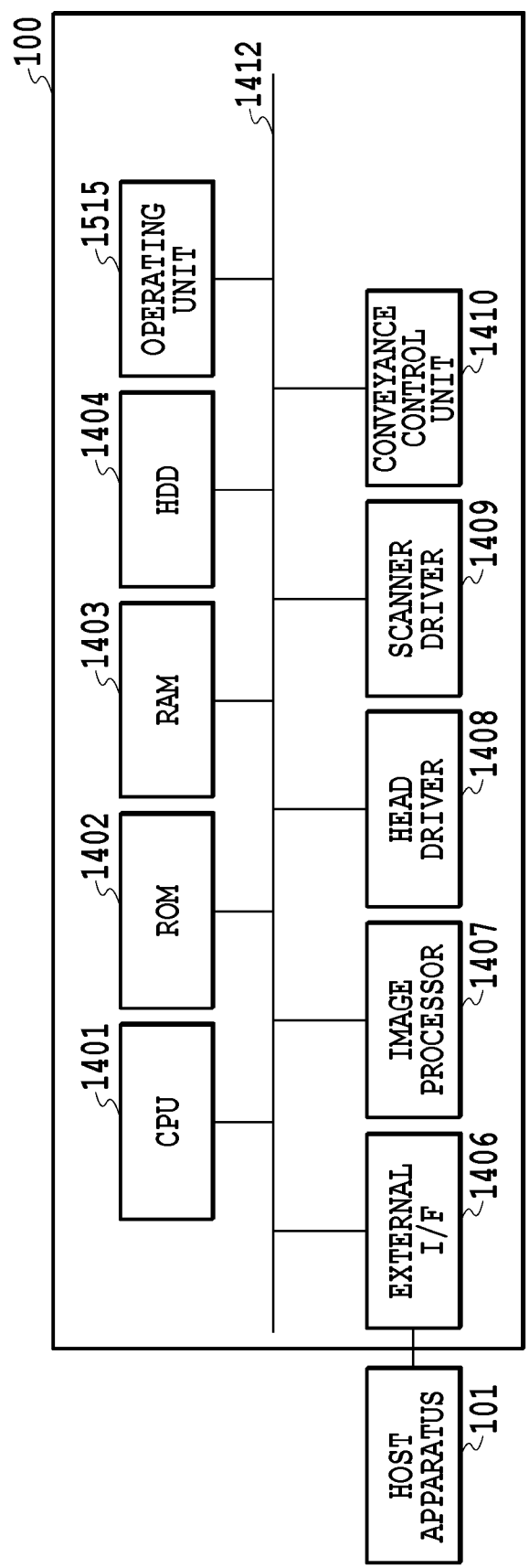
FIG. 2 is a block diagram showing a configuration of control in a control unit.

FIG. 2 is a block diagram showing a configuration of control in the control unit 1508. A CPU 1401 in the form of a microcomputer controls each mechanism in the apparatus via a corresponding engine based on a program and fixed data stored in a ROM 1402. A RAM 1403 and an HDD 1404 are used as work areas for the CPU 1401. For example, if a print job is input from an externally-connected host apparatus 101 via an external I/F 1406, the CPU 1401 stores job information in the RAM 1403 and stores image data associated with the job information in the HDD 1404. The host apparatus 101 may be a computer for generating and processing image data used for printing or a reader or camera for reading images.

An image processor 1407 executes predetermined image processing for the image data stored in the HDD 1404 based on the print job information stored in the RAM 1403 under instructions from the CPU 1401 to generate ejection data used for ejection of the printing heads 1506. The image processing includes, for example, a color space conversion from YCbCr to sRGB, a resolution conversion, quantization, an image analysis, an image correction, and the like. The processed image data is stored in the RAM 1403 or the HDD 1404.

A head driver 1408 controls the operation of each printing head 1506 based on the ejection data generated by the image processor 1407 under instructions from the CPU 1401. More specifically, the head driver 1408 gives ejection instructions to each of the ejecting elements arranged in the printing heads 1506, adjusts ejection timings and drive signals, and acquires ejection states.

A scanner driver 1409 controls the operation of the scanner unit 1507 under instructions from the CPU 1401. More specifically, the scanner driver 1409 controls image sensors such as CCDs or CISs arranged in the scanner unit 1507 to optically scan an image on a print medium, acquires red (R), green (G), and blue (B) analog signals, converts the analog signals into digital signals, and provides the digital signals to the CPU 1401. The CPU 1401 determines whether the image sensors normally operate based on the acquired image data and analyzes the image data to detect a problem in the printed image.

A conveyance control unit 1410 controls each of the paper feed unit 1501, the conveying unit 1502, and the sorting unit 1514 under instructions from the CPU 1401. For example, the conveyance control unit 1410 changes the conveyance speed in the conveying unit 1502, adjusts the nip pressure of the conveying rollers, and starts or stops using the sheet reversing unit 1513 according to the type of print medium and a print mode that are specified by a print job. If it is confirmed that paper feeding, conveyance or output is not carried out properly, the conveyance control unit 1410 stops the operation of a corresponding unit. The mechanisms described above are connected to each other via a system bus 1412.

Returning to FIG. 1, a change in operation of each mechanism included in the apparatus in response to a print job will be described below in detail. For example, it is assumed that images are continuously printed on a number of print media having a first size, which is a relatively small size, in response to a certain print job. In this case, the conveying rollers 1504 extending in the X direction (i.e., the width direction of the print media) have areas not in contact with the print media until the print job is finished, and these areas are prone to gather paper dust or dirt. Then, if a new print job is input and an image is printed on a print medium having a second size larger than the first size, the gathered paper dust or dirt may damage the image on the newly conveyed print medium and deteriorate the print quality. Further, for example, if simplex printing is continuously carried out and then duplex printing is carried out, a conveying path including the sheet reversing unit 1513, namely a conveying path not used for simplex printing is used after a long unused time. The possibility of deterioration also arises in this case. As described above, a problem is more likely to occur in an image at the timing of a change in usage condition of each mechanism, namely the timing of switching print jobs than at other timings because there is a high possibility that a mechanism whose usage condition has not been detected for a long time is used again.

In consideration of the above, in the present embodiment, an inspection is carried out at the timing of switching print jobs, in particular the timing of a change in usage condition of each mechanism.

Figure 3:
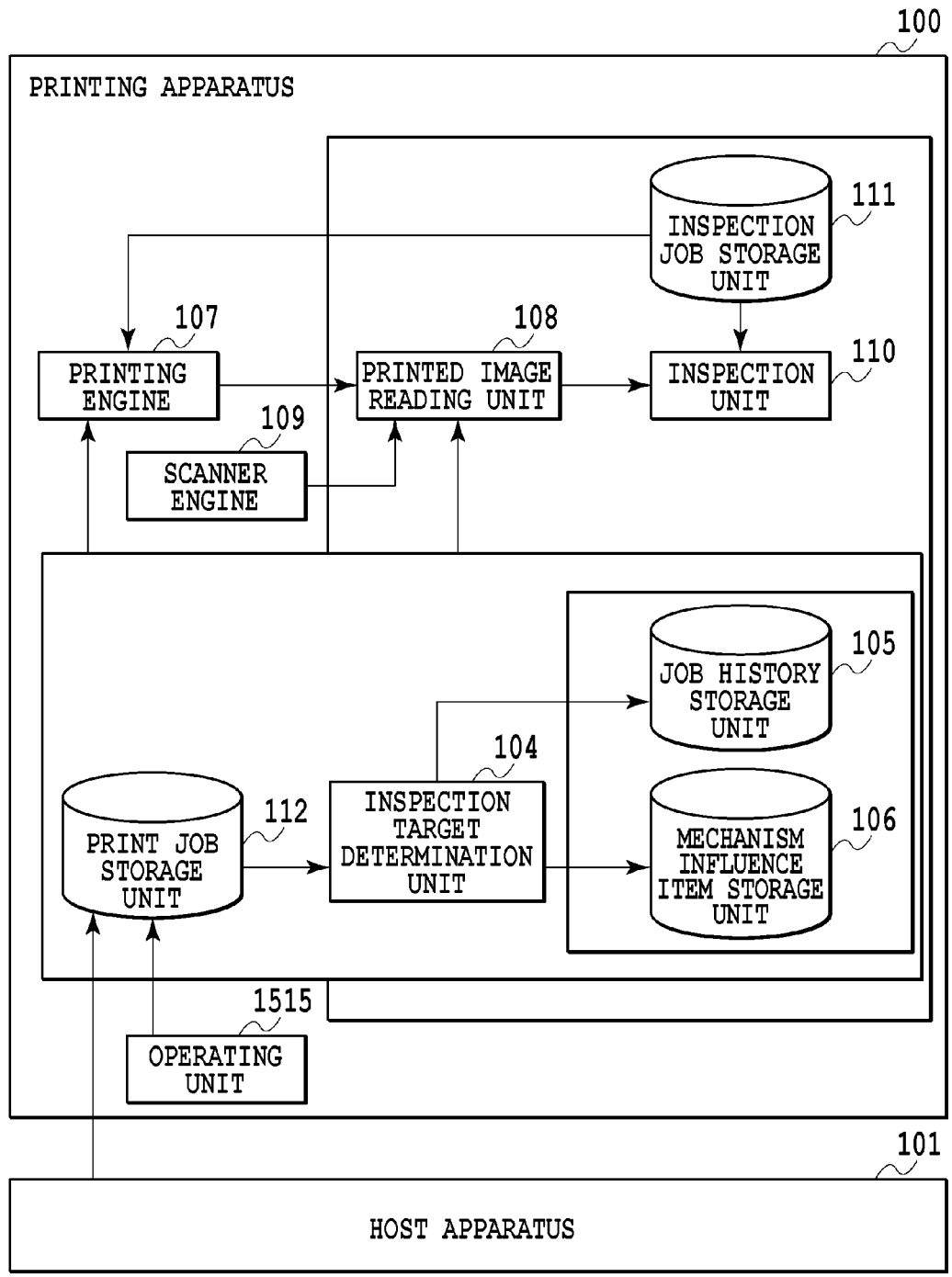
FIG. 3 is a block diagram showing a configuration of control for an interruption inspection in a first embodiment.
Figure 4:
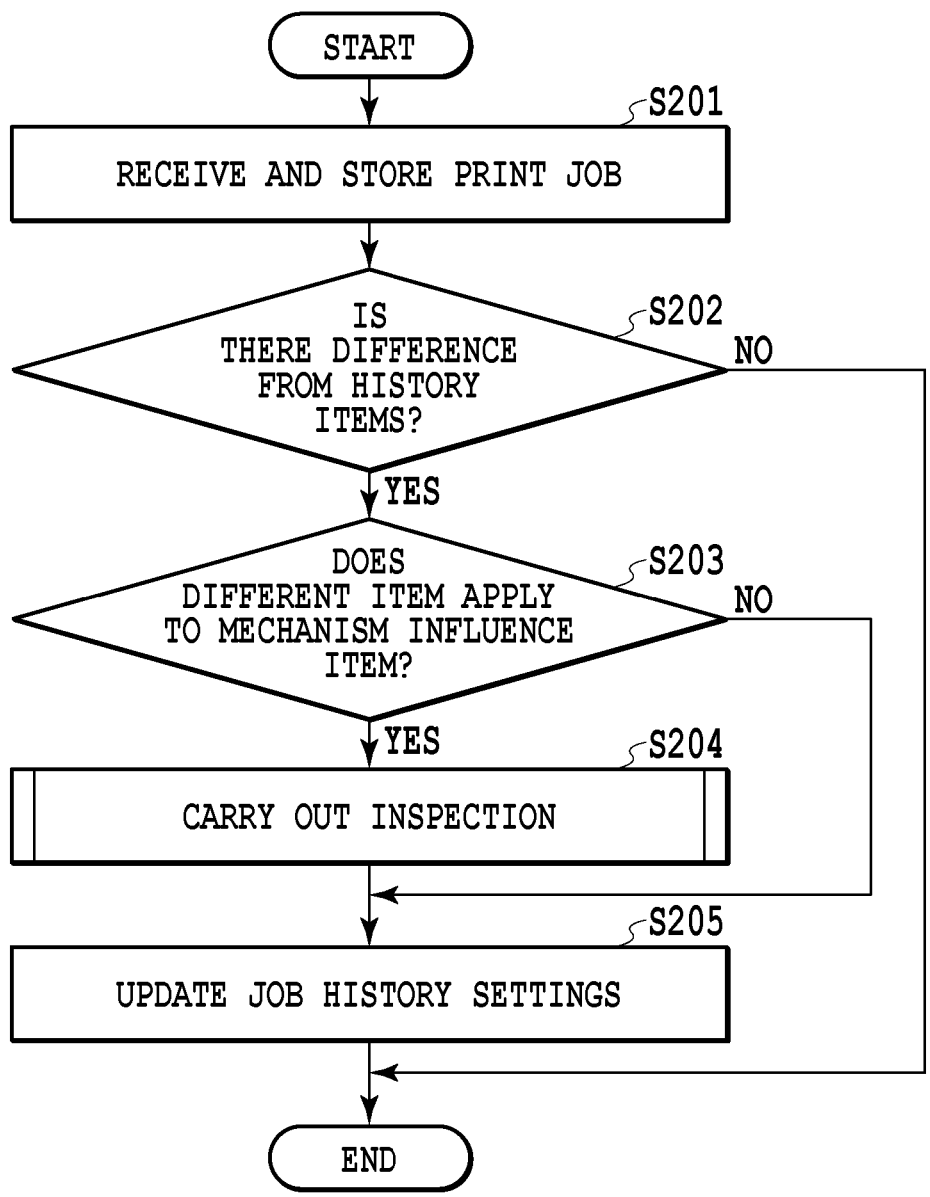
FIG. 4 is a flowchart of the interruption inspection in the first embodiment.

FIG. 3 is a block diagram showing a configuration of control for an interruption inspection in the present embodiment. The block diagram describes a software configuration of the interruption inspection and is practically a functional block diagram executed by the CPU 1401 in the control unit 1508 based on a program stored in the ROM 1402 by using the RAM 1403 as a work memory. FIG. 4 is a flowchart executed by the CPU 1401 for the interruption inspection. The processing will be described below in accordance with the flowchart of FIG. 4 with reference to FIG. 3.

If a print job is output from the host apparatus 101, the CPU 1401 stores job information on the print job in the RAM 1403 and stores image data in the HDD 1404 in step S201. Further, the CPU 1401 forms the job information stored in the RAM 1403 into a list of a predetermined format and stores the list in a print job storage unit 112 in the ROM 1402.

FIGS. 5A and 5B are tables showing examples of job items stored in the print job storage unit 112. The job items are items for specifying a printing method, namely pieces of information about print settings. In the present embodiment, seven items are prepared: "print medium size," "print medium type," "print layout," "ink setting," "number of pages," "number of copies," and "print quality." Settings are made for the respective seven items in FIGS. 5A and 5B. The job items may be acquired from a print job transmitted from the host apparatus 101 as described above, but may include an item input by a user through the operating unit 1515. It should be noted that the job items are not limited to the above items.

In step S202, the CPU 1401 accesses a job history storage unit 105 via an inspection target determination unit 104 and compares previously stored settings with the settings stored in the print job storage unit 112.

FIGS. 6A and 6B show examples of job items stored in the job history storage unit 105. The settings stored in the job history storage unit 105 correspond to the previous print job and are stored in the storage unit as a list of seven items in the same manner as in the print job storage unit 112. In step S202, if the CPU 1401 determines that there is no difference in settings between the print job storage unit 112 and the job history storage unit 105, the CPU 1401 finishes the processing without carrying out an interruption inspection. In contrast, in step S202, if the CPU 1401 determines that there is a difference in settings between the print job storage unit 112 and the job history storage unit 105, the CPU 1401 proceeds to step S203. If the print job storage unit 112 stores the settings shown in FIG. 5A and the job history storage unit 105 stores the settings shown in FIG. 6A, they are different in "print layout" and "number of pages." Accordingly, the CPU 1401 proceeds to step S203.

In step S203, the CPU 1401 accesses a mechanism influence item storage unit 106 via the inspection target determination unit 104. The CPU 1401 determines whether the items determined to be different in step S202 apply to any item defined as having an influence (having) in the mechanism influence item storage unit 106. In other words, the CPU 1401 determines whether a conveying mechanism is different (i.e., a conveying mechanism should be changed) based on the job items. FIG. 7 is a table showing settings stored in the mechanism influence item storage unit 106. In the table, "having" or "not having" is set to each of the seven items in advance based on whether each item is related to the conveying mechanism. More specifically, "print medium size" is defined as "having" because it has an influence on an area to be in contact with the print medium in the conveying path including the conveying roller 1504 and the like, and "print medium type" is also defined as "having" because it has an influence on a pressure applied to the print medium when the conveying rollers nip the print medium. Further, "print layout" is defined as "having" because it determines whether or not to use the path including the sheet reversing unit 1513, and "number of copies" is defined as "having" because it has an influence on a sorting mechanism in the sorting unit 1514 and the number of output trays 1516 to be used. In contrast, "not having" is set to "ink setting" for specifying the type of ink to be used, "number of pages," and "print quality" for specifying the image resolution and the printing speed, which are not directly related to the conveying mechanism.

That is, in step S203, the CPU 1401 determines whether the items determined to be different in step S202 include any item defined as "having" in the mechanism influence item storage unit 106. If not, the CPU 1401 jumps to step S205 without carrying out an interruption inspection. If so, the CPU 1401 proceeds to step S204 to carry out an interruption inspection. If the print job storage unit 112 stores the settings shown in FIG. 5A and the job history storage unit 105 stores the settings shown in FIG. 6A, the item "print layout" out of the items different between them is defined as "having" in the printing mechanism influence job settings shown in FIG. 7. Accordingly, the CPU 1401 proceeds to step S204.

In step S204, a predetermined inspection process is executed. More specifically, in a printed image reading unit 108, a scanner engine 109 is controlled to scan an inspection image printed based on image data associated with the print job, thereby acquiring image data on the inspection image. Then, the acquired image data is provided to an inspection unit 110 to determine whether the image includes any failure or the like (i.e., carry out an inspection).

In the present embodiment, the image printed based on the print job is inspected. However, an inspection job stored internally for inspection may be used. In this case, the inspection job is executed before a target print job. More specifically, the CPU 1401 accesses an inspection job storage unit 111, controls a printing engine 107 based on settings stored in the inspection job storage unit 111, and causes a printing unit to print a predetermined inspection image on a print medium. Then, the CPU 1401 controls the scanner engine 109 to scan the inspection image, thereby acquiring image data. The acquired image data is provided to the inspection unit 110 to determine whether the image includes any failure or the like. FIG. 8 is a table showing an example of settings stored in the inspection job storage unit 111. In the case of using the inspection job in the present embodiment, the settings of the inspection job storage unit 111 are made based on the current settings of the print job storage unit 112. However, the settings of the inspection job storage unit 111 are not a copy of the entire settings of the print job storage unit 112. In the case of FIG. 8, the number of pages is reduced from 5 to 1 and the number of copies is reduced from 3 to 1 compared to the settings shown in FIG. 5A in order to minimize the time required for the inspection process and the amount of consumables to be used. The same printing operation as actual printing for one page of one copy is sufficient to assure the quality of an image to be printed in the subsequent actual printing. Only the number of copies may be reduced without reducing the number of pages. In this manner, the inspection job storage unit 111 stores minimum settings required to assure the quality of an image to be actually printed based on the print job storage unit 112.

After the inspection process is finished in step S204, the CPU 1401 proceeds to step S205 and overwrites the job history storage unit 105 with the settings of the print job storage unit 112, thereby finishing the processing.

After that, actual printing is carried out depending on the state of the inspection process. For example, if the inspection process is not carried out in the above flowchart or no problem is detected in the inspection process, actual printing is only required to be carried out in a manner according to the print job storage unit 112 without any change. In this case, if printing is already carried out for the first piece of image data input as the print job in the inspection process of step S204, actual printing is required to be carried out for only the remaining pieces of image data. If image data prepared for inspection is used in the inspection process, actual printing is required to be carried out for all the pieces of image data input as the print job. If any problem is detected in the inspection process of step S204, a user may be notified of the inspection result through the operating unit 1515 or the host apparatus 101 or actual printing may be carried out after automatically solving the problem.

According to the present embodiment described above, each time a new print job is input, settings of the new print job are stored in the print job storage unit 112 and the settings previously stored in the print job storage unit 112 are stored in the job history storage unit 105. Then, an interruption inspection process is carried out only in the case where the usage condition of the conveying mechanism in the apparatus is changed as a result of a comparison between the previous settings and the current settings. In other cases, actual printing is carried out based on the new print job without carrying out an interruption inspection process. In short, according to the present embodiment, only a minimum inspection process required to assure the quality of an image to be printed based on the new print job is carried out at the timing of input of the print job. As a result, the high reliability of image output can be maintained while improving the inspection efficiency compared to the conventional means.

Further, according to the present embodiment, the mechanism influence item storage unit 106 described with reference to FIG. 7 is rewritten as appropriate. More specifically, if a change is made in an influence item for stopping using a thing that has been used, "not having" is set to this influence item. The inspection efficiency can thereby be improved. For example, with respect to "print layout," an inspection is necessary in the case of switching simplex printing to duplex printing because the sheet reversing unit 1513 which has not been used is used again. However, an inspection is not necessary in the case of switching duplex printing to simplex printing because the sheet reversing unit 1513 which has been used is merely taken out of use. That is, an inspection is not necessary in the case of a change for stopping using a thing that has been used. In this case, the inspection efficiency can be further improved if "not having" is set to the corresponding item.

(Second Embodiment)

In the first embodiment, the items having an influence mainly on the conveying mechanism in the printing apparatus are defined as "having" in the mechanism influence item storage unit 106. In contrast, in the present embodiment, setting items for a print mode having an influence on an image are also defined as the influence items in addition to the items having an influence on the conveying mechanism.

Figure 9:
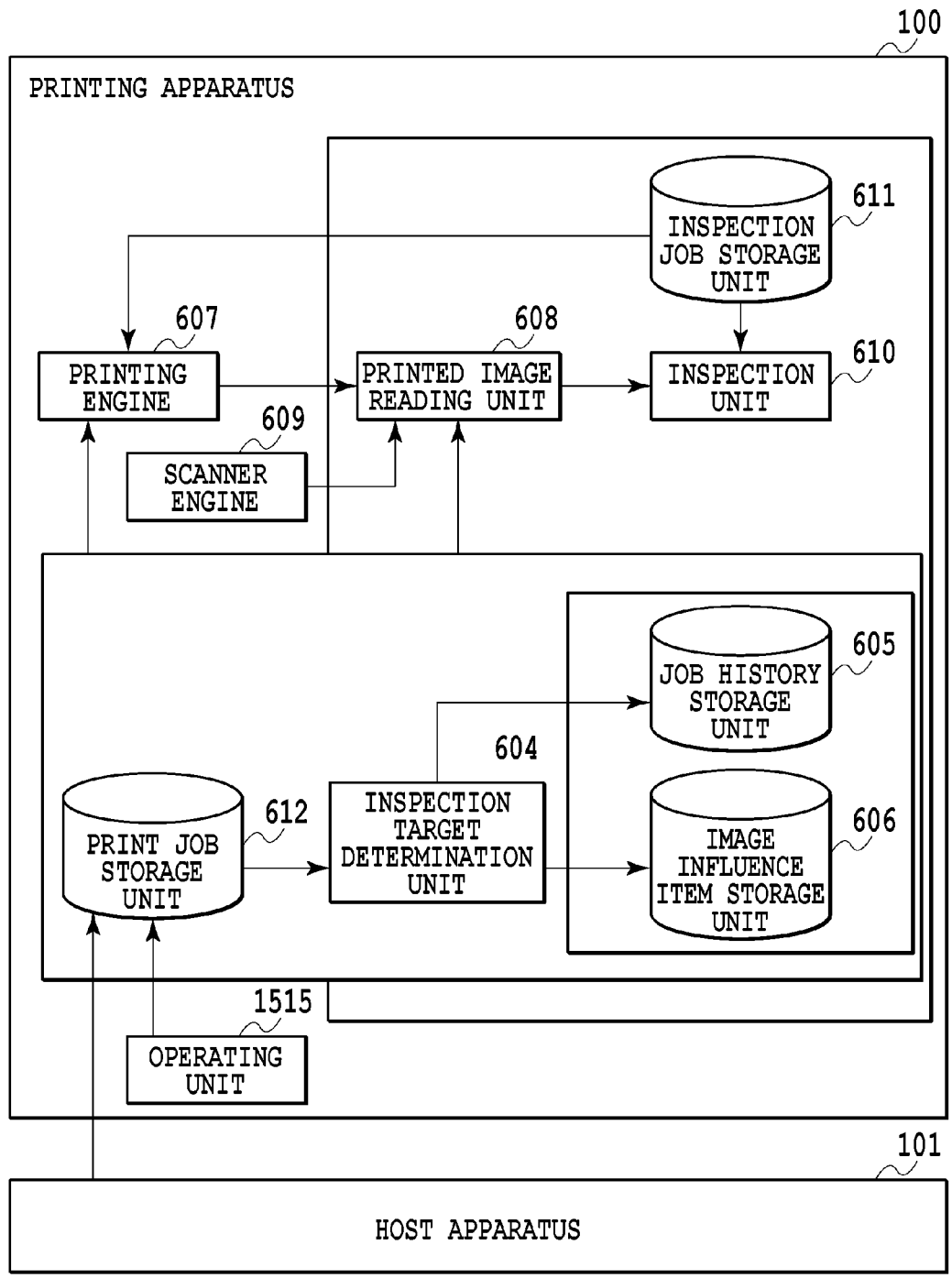
FIG. 9 is a block diagram showing a configuration of control for an interruption inspection in a second embodiment.

FIG. 9 is a block diagram showing a configuration of control for an interruption inspection in the present embodiment. FIG. 9 is different from FIG. 3 in that the mechanism influence item storage unit is replaced with an image influence item storage unit 606. The other elements having the same names as those of the first embodiment have the same functions and consequently no further description will be provided.

FIG. 10 is a table showing settings stored in the image influence item storage unit. In addition to the items defined as "having" in the printing mechanism influence job items in FIG. 7, "not having" is set to two items: "ink setting" and "print quality." The item "ink setting" relates to settings of the type of ink to be used, which has no influence on the conveying path. However, if a change is made in "ink setting" and a printing head that has not been used for a long time is used again, there is a possibility that an image is unstable until the ejection state of the printing head is stabilized. With respect to "print quality," the print resolution and the print speed are changed depending on whether a high quality mode or a high speed mode is selected. Accordingly, the ejection frequency of the printing heads and the conveying speed are changed, which may have an influence on an image. In the present embodiment, "having" or "not having" is set to each of the seven items in advance in consideration of the influence of changes in the print mode on an image.

Figure 11:
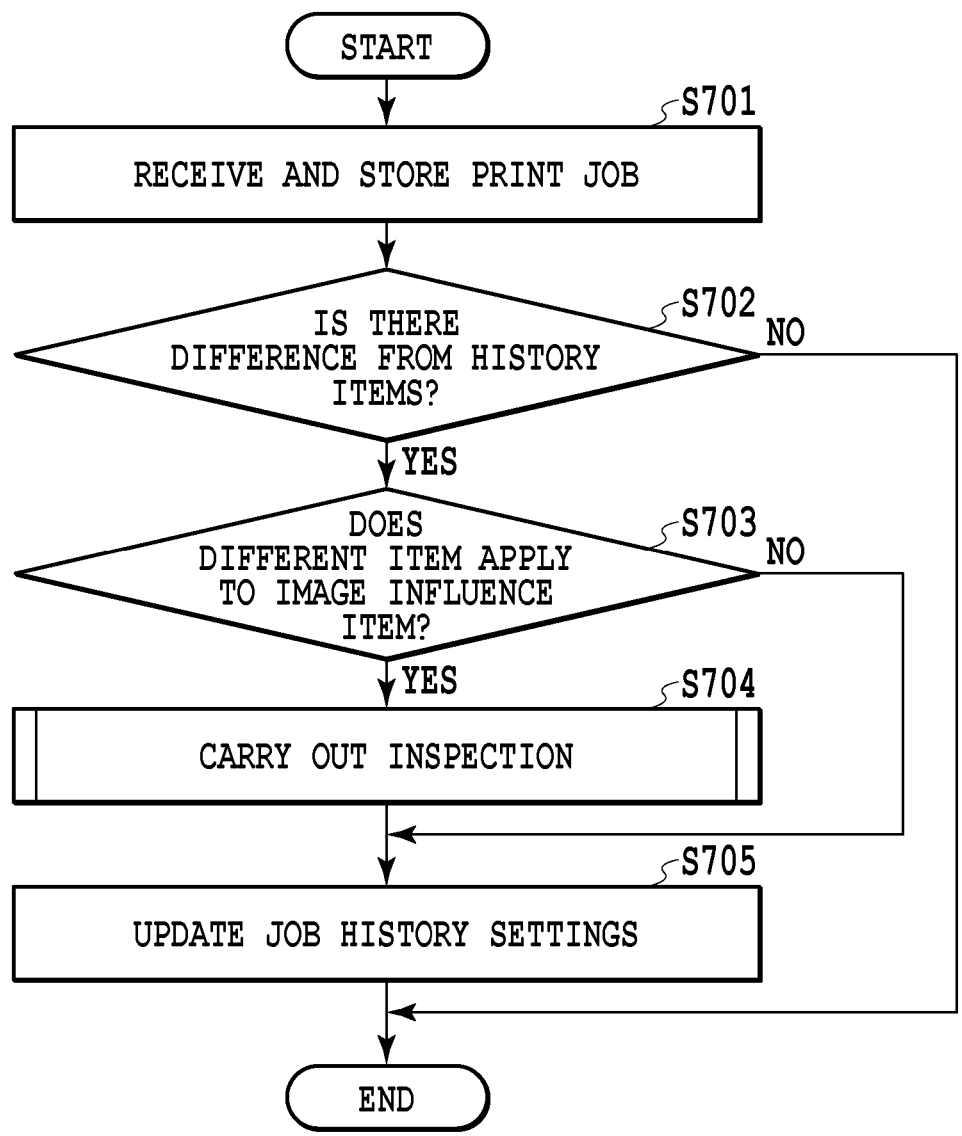
FIG. 11 is a flowchart of the interruption inspection in the second embodiment.

FIG. 11 is a flowchart executed by the CPU 1401 for the interrupt inspection. FIG. 11 is different from the flowchart of FIG. 4 described in the first embodiment only in step S703. Steps S701, S702, S704, and S705 are the same as steps S201, S202, S204, and S205, respectively, and consequently no further description will be provided. In step S703, the CPU 1401 determines whether the items determined to be different in step S702 include any item defined as "having" in the image influence item storage unit 606.

For example, if the print job storage unit 612 stores the settings shown in FIG. 5B and the job history storage unit 605 stores the settings shown in FIG. 6B, the CPU 1401 determines that they are different in "ink setting" and "number of pages" in step S702, and proceeds to step S703. Further, in step S703, the CPU 1401 determines that "ink setting" out of the above two items is defined as "having" in the printing mechanism influence job settings shown in FIG. 10, and proceeds to an inspection process of step S704. That is, in the present embodiment, an inspection process is carried out at the time of input of a new print job if there is a possibility that a change in the print quality settings has an influence on an image even though the conveying mechanism is not changed.

Further, also in the present embodiment, the image influence item storage unit 606 is rewritten as appropriate. More specifically, if a change is made in an influence item for stopping using a thing that has been used, "not having" is set to the influence item. The inspection efficiency can thereby be improved. For example, with respect to "ink setting," an inspection is necessary in the case of switching a monochrome mode using only black ink to a color mode using all the ink colors because the printing heads 1506 corresponding to colors that have not been used are used again at this timing. However, an inspection is not necessary in the case of switching the color mode to the monochrome mode because a printing head that ejects black ink has already been used at this timing. In this case, "not having" may be set to "ink setting" in the image influence item storage unit 606 at the same time when "print quality" is changed to the color mode in the job history storage unit 605. In this manner, an inspection process related to "ink setting" will not be carried out regardless of whether the next print job is in the color mode or the monochrome mode. As a result, the inspection efficiency can be further improved.

(Third Embodiment)

In the present embodiment, an inspection is carried out at predetermined printing intervals and the interruption inspection described in the second embodiment is further carried out. The predetermined printing interval may be a predetermined number of pages or copies. In the description below, the inspection carried out at the predetermined printing intervals is referred to as a regular inspection.

Figure 12:
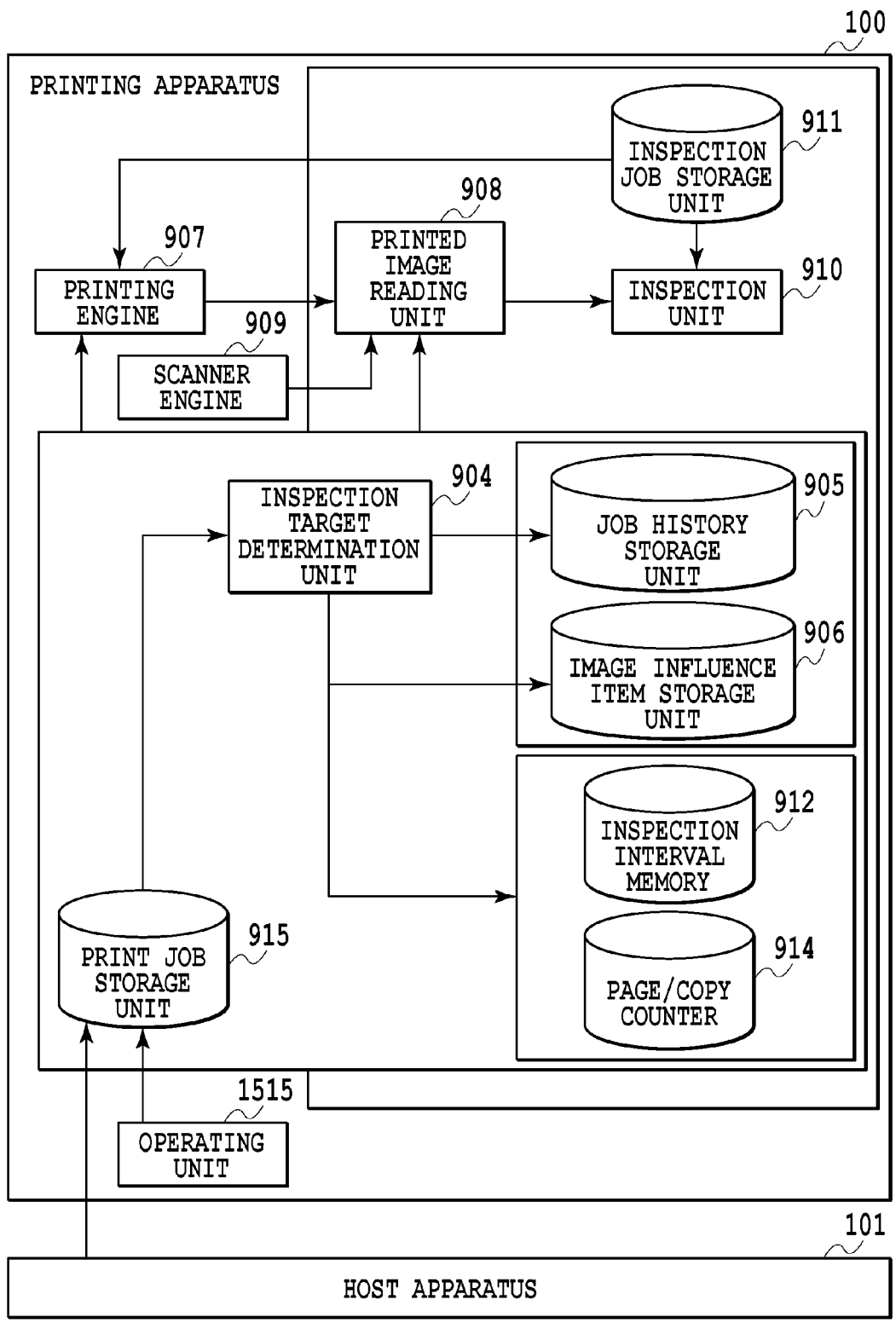
FIG. 12 is a block diagram showing a configuration of control for an interruption inspection in a third embodiment.

FIG. 12 is a block diagram showing a configuration of control for the interruption inspection in the present embodiment. FIG. 12 is different from FIG. 9 described in the second embodiment in that an inspection interval memory 912 and a page/copy counter 914 are added. The other elements having the same names as those of the second embodiment have the same functions and consequently no further description will be provided.

The inspection interval memory 912 stores a page interval Tp and a copy interval Td for the regular inspection. FIG. 13A shows an example of the page interval Tp and the copy interval Td stored in the inspection interval memory 912. The settings in the inspection interval memory 912 can be made by a user as appropriate through the operating unit 1515.

Even during the execution of a print job, an inspection target determination unit 904 of the present embodiment increments a page counter Cp each time printing for one page is finished, compares a count value of the page counter Cp with the page interval Tp, increments a copy counter Cd each time printing for one copy is finished, and compares a count value of the copy counter Cd with the copy interval Td. FIG. 13B shows the count values of the page counter Cp and the copy counter Cd at a certain timing. Even during the execution of a print job, the CPU 1401 executes an inspection process at the time when Cp=Tp or Cd=Td, and resets Cp and Cd (Cp=0, Cd=0).

Figure 14:
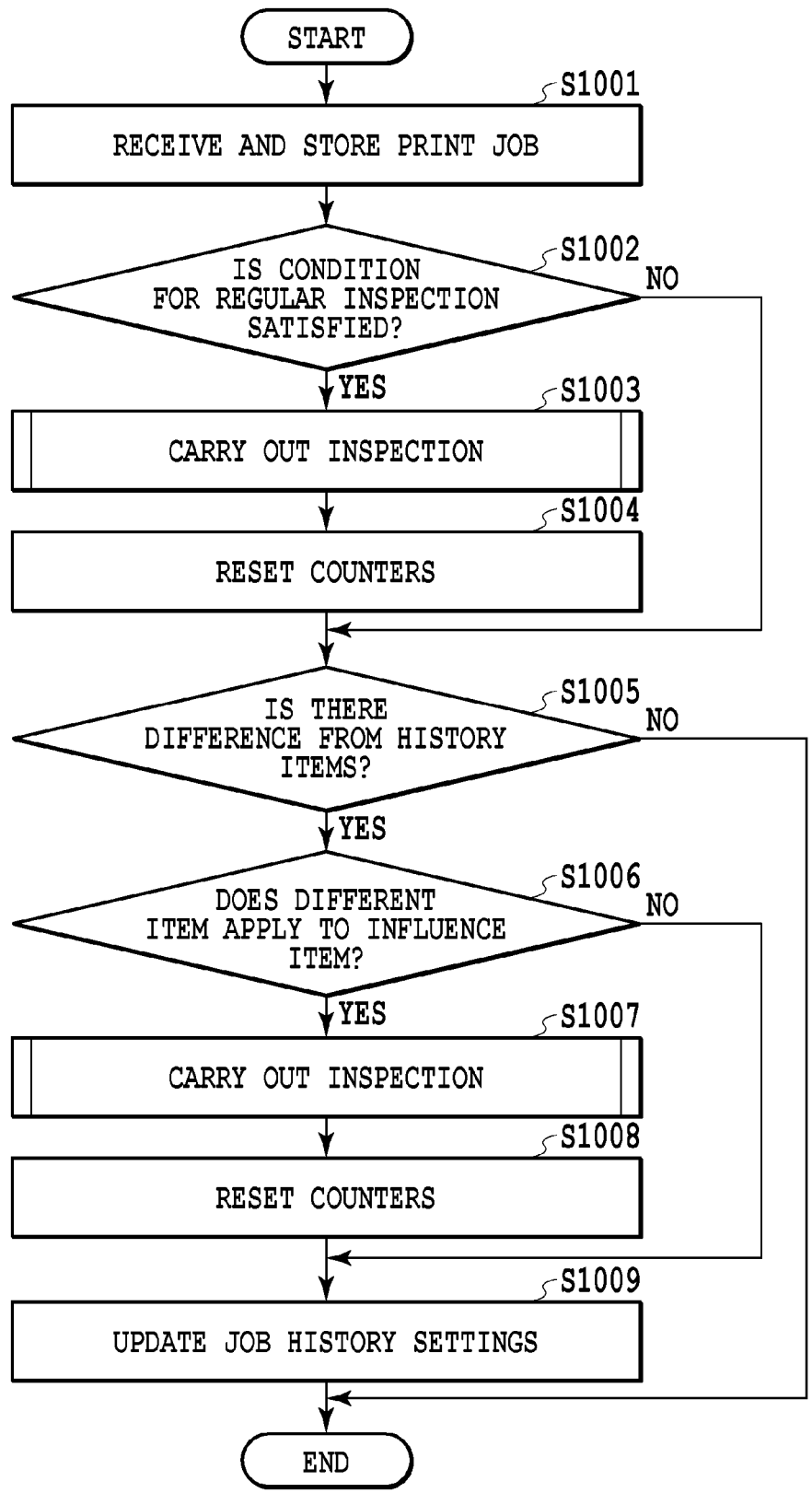
FIG. 14 is a flowchart of the interruption inspection in the third embodiment.

FIG. 14 is a flowchart executed by the CPU 1401. Since step S1001 is the same as step S701 of FIG. 11 described in the second embodiment, no further description will be provided.

In step S1002, the CPU 1401 determines whether a condition for the regular inspection is satisfied. To be more specific, the CPU 1401 determines whether either one of the page interval Tp and the copy interval Td for the regular inspection stored in the inspection interval memory 912 is satisfied. If the CPU 1401 determines that the condition is not satisfied, the CPU 1401 proceeds to step S1005. If the CPU 1401 determines that the condition is satisfied, the CPU 1401 proceeds to step S1003 and carries out an inspection. Since the inspection method is the same as the interruption inspection, no further description will be provided. The CPU 1401 proceeds to step S1004, resets the page counter Cp and the copy counter Cd (Cp=0, Cd=0), and then proceeds to step S1005.

Since steps S1005 to S1007 are the same as steps S702 to S704, no further description will be provided.

After the inspection process is finished in step S1007, the CPU 1401 proceeds to step S1008 and resets the page counter Cp and the copy counter Cd (Cp=0, Cd=0). In step S1009, the CPU 1401 overwrites the job history storage unit 905 with the settings of the print job storage unit 915 in the same manner as the embodiments described above, thereby finishing the processing.

According to the present embodiment, an inspection process is executed at the time when the page counter Cp reaches Tp or the copy counter Cd reaches Td during the execution of the print job. An inspection is further carried out in the case of a print job determined to require an inspection process because of a change in the image influence item. As a result, the high reliability of image output can be maintained even in the case of a print job for a number of pages or copies.

If the inspection process is executed in step S1008 along with a change in the image influence item, the page counter Cp and the copy counter Cd are reset at the same time as the execution of the inspection process. Accordingly, the inspection process along with the change in the image influence item and the regular inspection process are prevented from being continuously carried out. As a result, the high inspection efficiency can be maintained.

(Fourth Embodiment)

Figure 15:
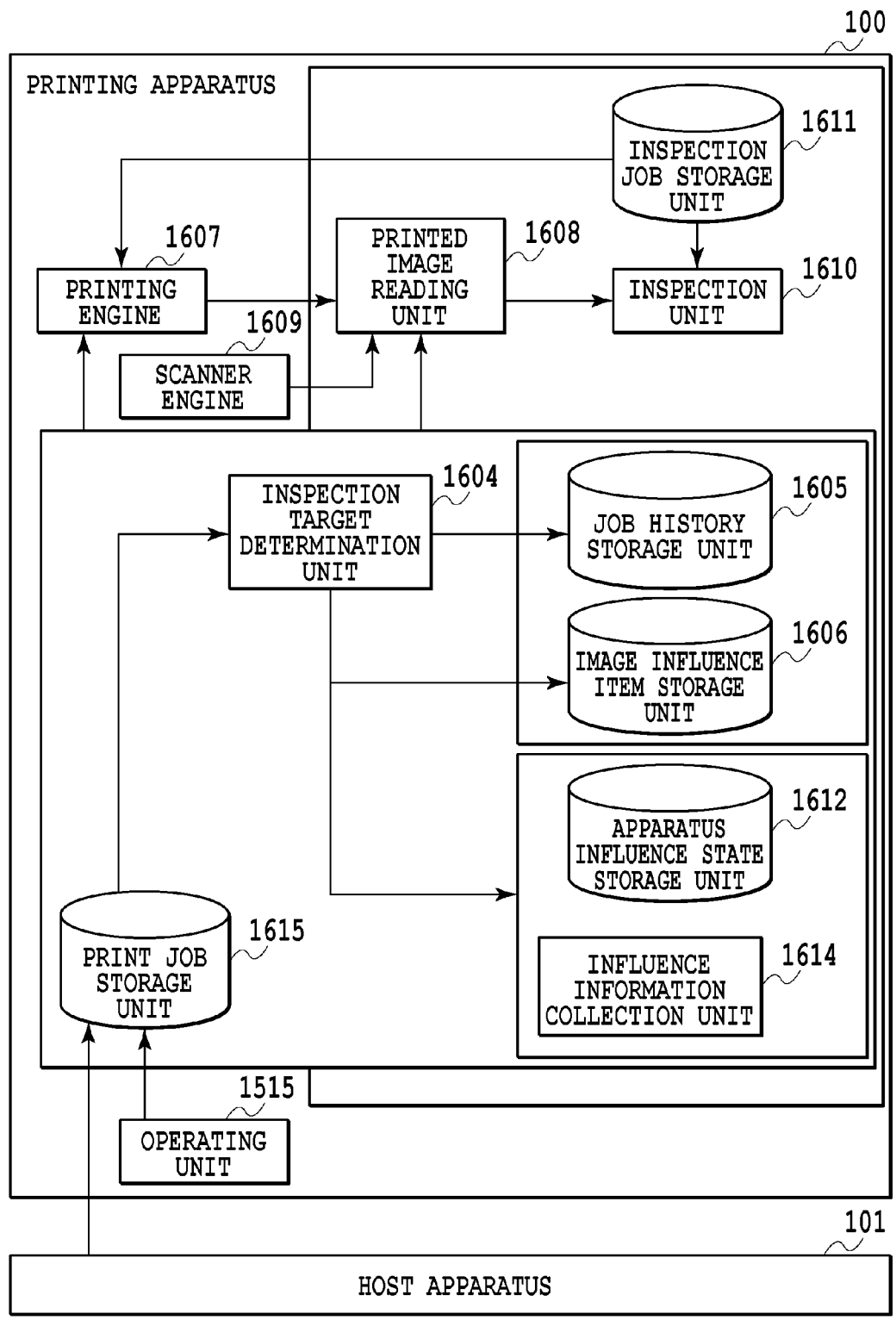
FIG. 15 is a block diagram showing a configuration of control for an interruption inspection in a fourth embodiment.

FIG. 15 is a block diagram showing a configuration of control for an interruption inspection in the present embodiment. FIG. 15 is different from FIG. 9 described in the second embodiment in that an apparatus influence state storage unit 1612 and an influence information collection unit 1614 are added. The apparatus influence state storage unit 1612 is an area to store whether any change in the apparatus is caused by a factor other than a print job. "Present" or "absent" is set to the apparatus influence state storage unit 1612. If the change occurs, the influence information collection unit 1614 detects the change and sets "present" to the apparatus influence state storage unit 1612.

The above change in the apparatus means a change that may have an influence on an image in the printing operation immediately after the change. For example, the change includes a paper jam during the conveyance, opening and closing of a door to replenish print media, a replacement of ink tanks, an automatic change of a paper feed tray due to consumption of print media, the execution of a maintenance process for the printing heads 1506 and the drying unit 1512, and the like.

Figure 16:
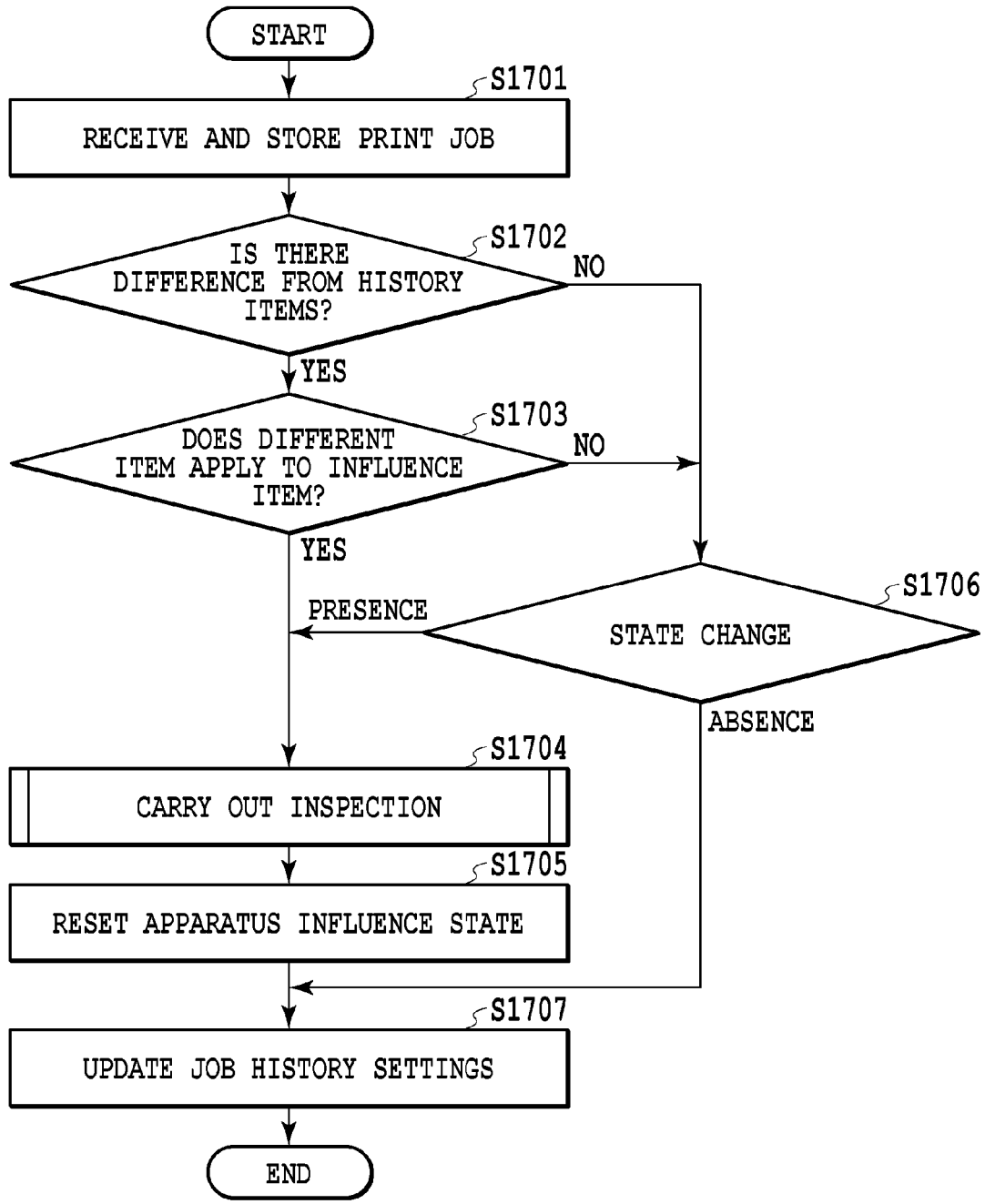
FIG. 16 is a flowchart of the interruption inspection in the fourth embodiment.

FIG. 16 is a flowchart executed by the CPU 1401 at the time of input of a new print job. Steps S1701 to S1704 are the same as steps S701 to S704 of FIG. 11 described in the second embodiment. That is, if the CPU 1401 determines that an inspection process is necessary along with a change in the print mode in steps S1702 and S1703, the CPU 1401 proceeds to step S1704 and carries out a predetermined inspection process. If the CPU 1401 determines that an inspection is unnecessary (No in step S1702 or S1703), the CPU 1401 proceeds to step S1706.

In step S1706, the CPU 1401 determines whether a state is changed. More specifically, the CPU 1401 checks which of "presence" and "absence" is set to the apparatus influence state storage unit 1612 through the inspection target determination unit 1604. In the case of "presence," the CPU 1401 proceeds to step S1704, carries out a predetermined inspection process, proceeds to step S1705, and sets "absence" to the apparatus influence state storage unit 1612. In contrast, if "absence" is set to the apparatus influence state storage unit 1612 in step S1706, the CPU 1401 jumps to step S1707. In step S1707, the CPU 1401 overwrites the job history storage unit 1603 with the settings of the print job storage unit 1615 in the same manner as the embodiments described above, thereby finishing the processing.

According to the present embodiment described above, an inspection process can be executed if any change in the apparatus may have an influence on an image, even though a print job is determined to require no inspection process along with a change in the image influence item. As a result, it is possible to execute a necessary maintenance process, a replenishment of consumables, troubleshooting, and the like without the need to concern about an excessive inspection process even in the case where print jobs of a number of pages or copies are continuously input.

(Other Embodiments)

The present invention is not limited to the embodiments described above. For example, the first embodiment may be modified so as to carry out both the regular inspection and the interruption inspection. Further, for example, the first to third embodiments may be modified so as to carry out the interruption inspection in the case of a change in the apparatus that may have an influence on an image in the same manner as the fourth embodiment. In the second embodiment, a change in the print settings (items) having an influence on both the conveying mechanism and image is checked. However, the second embodiment is not limited to this and may be modified so as to check only a change in the print settings having an influence on the image. In the above embodiments, the full line type color inkjet printing apparatus shown in FIG. 1 is described as an example. However, the present invention is not limited to the form shown in FIG. 1. For example, the print media may be a continuous paper roll which is cut with a cutter per page after printing. Further, the printing apparatus may be of a serial type forming an image by alternately repeating print scanning of a printing head and conveyance operation of a print medium. Furthermore, various printing methods such as sublimation printing, thermal transfer printing, dot matrix printing, LED printing, and electrophotographic printing may be used besides inkjet printing.

Further, in the above description, the CPU 1401 provided in the printing apparatus 100 carries out the series of processes described in the embodiments. However, the present invention is not limited to these embodiments. For example, the above-described processes inside the printing apparatus may be carried out by the externally-connected host apparatus 101. In this case, the scanner unit 1507 used for the inspection process is not necessarily provided inside the apparatus. A scanner device independent of the printing apparatus 100 and the host apparatus 101 may be prepared to implement the above embodiments under the control of the host apparatus 101. Further, each mechanism shown in FIG. 1 may be further divided according to the functions or may be integrated with another mechanism. Some or all of the mechanisms may have their own CPUs.

Further, the present invention may be implemented by supplying a program that carries out one or more functions of the above embodiments to a system or apparatus through a network or storage medium and allowing one or more processors in a computer of the system or apparatus to load and execute the program. The present invention may also be implemented by a circuit (e.g., an ASIC) which carries out one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-108112 filed May 31, 2016, which is hereby incorporated by reference wherein in its entirety.

What is claimed is:

1. A controlling apparatus for controlling a printer, comprising:
    at least one memory storing instructions; and
    at least one processor executing the instructions to
    receive a print job;
    determine whether there is a difference between a first conveying mechanism that has been used for a first print job received and a second conveying mechanism that is to be used for a second print job received after the first print job; and
    execute, according to the determination that there is a difference between the first conveying mechanism and the second conveying mechanism, an inspection process based on a result of reading a print medium that has been conveyed using the second conveying mechanism, after a printing operation of the first print job.

2. The controlling apparatus according to claim 1, wherein the inspection process inspects an image printed based on the first print job.

3. The controlling apparatus according to claim 1, wherein the inspection process inspects an image printed based on an inspection job for inspection.

4. The controlling apparatus according to claim 1, wherein it is determined whether there is a difference between the first print job and the second print job in a print setting having an influence on an image, and
    an inspection process is executed in a case where it is determined that there is a difference in the print setting having an influence on an image.

5. The controlling apparatus according to claim 1, further comprising:
    a first storage unit configured to store the settings of the second print job; and a second storage unit configured to store a setting item having an influence on the first conveying mechanism,
wherein it is determined that there is a difference between the first conveying mechanism and the second conveying mechanism in a case where a setting item different between the settings of the first print job received and the settings of the second print job acquired from the first storage unit applies to the setting item having an influence on the first conveying mechanism, acquired from the second storage unit.

6. The controlling apparatus according to claim 1, wherein an inspection process is executed at predetermined intervals.

7. The controlling apparatus according to claim 1, further comprising a printing unit configured to print an image.

8. The controlling apparatus according to claim 1, further comprising a print control unit that controls a printing process based on a determination that;
   i) in a case where it is determined that there is a difference in the first conveying mechanism and the second conveying mechanism, a reading process for reading a print medium that has been conveyed using the second conveying mechanism and an execution process based on a result of the reading process are performed, after a printing operation of the first print job, and
   ii) in a case where it is determined that there is no difference in the first conveying mechanism and the second conveying mechanism, a printing operation of the second print job is performed without performing the reading process and the execution process.

9. The controlling apparatus according to claim 1, wherein it is determined whether there is a difference between a first conveying path for the first print job as the first conveying mechanism and a second conveying path for the second print job as the second conveying mechanism.

10. An inspection method for controlling a printer, comprising the steps of:
   receiving a print job;
   determining whether there is a difference between a first conveying mechanism that has been used for a first print job received in the receiving step and a second conveying mechanism that is to be used for a second print job received after the first print job; and
   executing, according to the determination that there is a difference in the first conveying mechanism and the second conveying mechanism, an inspection process based on a result of reading a print medium that has been conveyed using the second conveying mechanism, by an image reading unit, after a printing operation of the first print job.

* * * * *